(12) United States Patent
Koji

(10) Patent No.: US 7,500,459 B2
(45) Date of Patent: Mar. 10, 2009

(54) SEALING DEVICE

(75) Inventor: Tsukamoto Koji, Shizuoka (JP)

(73) Assignee: Nok Corporation, Tokyo (JP)

( * ) Notice: Subject to any disclaimer, the term of this patent is extended or adjusted under 35 U.S.C. 154(b) by 7 days.

(21) Appl. No.: 11/662,187

(22) PCT Filed: Jul. 14, 2005

(86) PCT No.: PCT/JP2005/012987

§ 371 (c)(1),
(2), (4) Date: Mar. 8, 2007

(87) PCT Pub. No.: WO2006/033197

PCT Pub. Date: Mar. 30, 2006

(65) Prior Publication Data

US 2008/0092844 A1    Apr. 24, 2008

(30) Foreign Application Priority Data

Sep. 24, 2004 (JP) .............................. 2004-277116

(51) Int. Cl.
*F02F 7/00* (2006.01)
*F02B 77/00* (2006.01)

(52) U.S. Cl. ................................. 123/195 C

(58) Field of Classification Search ......... 123/467–470, 123/195 C, 309, 647
See application file for complete search history.

(56) References Cited

U.S. PATENT DOCUMENTS 6,647,943 B2 * 11/2003 Leimer et al. .......... 123/190.17
2007/0262486 A1 * 11/2007 Waters et al. ................ 264/220

FOREIGN PATENT DOCUMENTS

| JP | 07-105775 | 4/1995 |
| JP | 10-281293 | * 10/1998 |
| JP | 11-173423 | 6/1999 |
| JP | 11-288630 | 10/1999 |

* cited by examiner

*Primary Examiner*—Hai H Huynh
(74) *Attorney, Agent, or Firm*—Jacobson Holman PLLC

(57) ABSTRACT

An object of the invention is to provide a sealing device having a function capable of a plurality of tubular members such as plug tubes or the like being inserted side by side for sealing. In a sealing device (1) attached in an opening portion (2a) of a housing (2) for sealing between the housing (2) and tubular members (3) inserted to the opening portion (2a) of the housing (2), the sealing device (1) integrally has a mounting portion (4) fixed to the housing (2), seal lips (6) brought into close contact with outer peripheral surfaces (3a) of the tubular members (3) and following deformation portions (7) provided between the mounting portion (4) and the seal lips (6). The mounting portion (4) has a plurality of tubular inner surfaces (5), in which the tubular members (3) are inserted within a flat surface. Further, a plurality of the seal lips (6) and the following deformation portions (7) are provided in correspondence to the respective tubular inner surfaces (5).

1 Claim, 9 Drawing Sheets

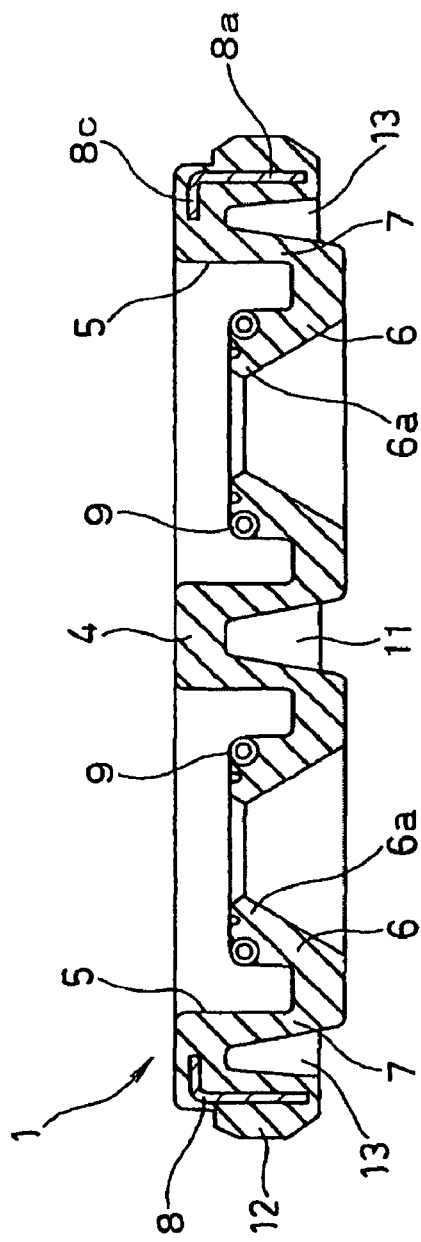
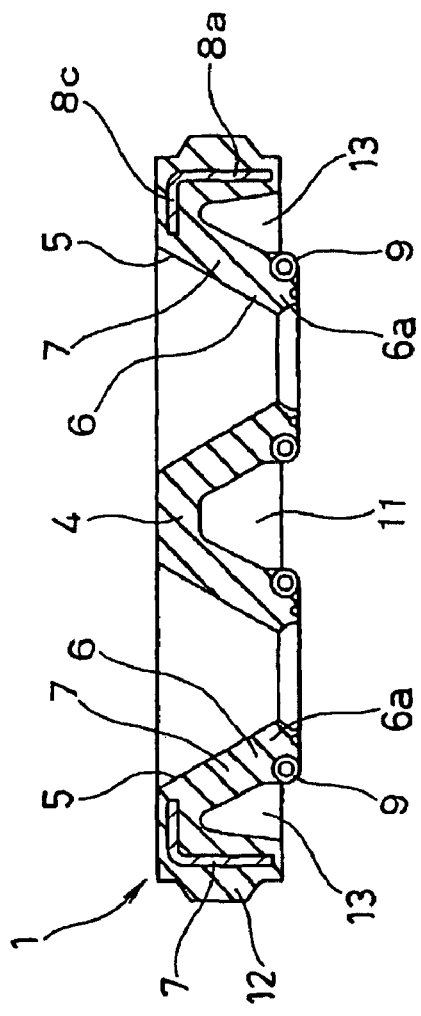
FIG. 11(A)
FIG. 11(B)

SEALING DEVICE

This is a national stage of PCT/JP2005/012987filed on 14 Jul. 2005 and published in Japanese.

BACKGROUND OF THE INVENTION

1. Field of the Invention

The present invention relates to a sealing device concerning a sealing technique. The sealing device in accordance with the present invention is used in a field of a motor vehicle, a construction machine, a farm machine, other general industrial machineries or the like. For example, in the motor vehicle relevant field, the sealing device is used for sealing between a cylinder head cover and a plug tube or between the cylinder head cover and an injection pipe in an internal combustion engine.

2. Description of the Conventional Art

In conventional, as shown in FIG. 12, there has been known a sealing device 53 attached in an opening portion 51a of a housing (a cylinder head cover in the drawing) 51 for sealing between the housing 51 and a tubular member (a fuel injection nozzle in the drawing) 52 inserted to the opening portion 51a of the housing 51, and the sealing device 53 integrally has a mounting portion 54 fixed to the housing 51, and a seal lip 55 brought into close contact with an outer peripheral surface of the tubular member 52 (refer to Japanese Unexamined Patent Publication No. 11-173423, patent document 1).

Since the sealing device 53 having the structure mentioned above is structured such that the mounting portion 54 constituted by a rubber-like elastic body is brought into close contact with an inner peripheral surface of the housing opening portion 51a at an outer peripheral bead 54a thereof, and the seal lip 55 is brought into close contact with an outer peripheral surface of the tubular member 52 at a lip end 55a thereof, the sealing device 53 can sufficiently seal between the housing 51 and the tubular member 52.

In recent years, in a gasoline engine among the internal combustion engine, there has been developed a multi simultaneous ignition system called as a twin plug, and there has been explained that the twin plug has the following advantages.

When igniting gasoline so as to explode, it is possible to more completely burn an air-fuel mixture within a combustion chamber by simultaneously igniting the gasoline at two positions rather than one position. At the same time, since a flame propagation is executed at two positions, a great explosion is instantaneously generated, a torque is increased, a startability of the engine is improved, and it is possible to obtain a sharp accelerating performance. If the accelerating performance is improved, it is possible to reduce a time required for making the engine in a high speed operation, whereby it is possible to improve a specific fuel consumption.

In the twin plug mentioned above, since two ignition plugs are used side by side, two guide tubes guiding the ignition plugs are provide side by side. However, the sealing device 51 in FIG. 12 mentioned above is not structured such that two plug tubes are inserted together therein so as to be sealed.

SUMMARY OF THE INVENTION

Problem to be Solved by the Invention

The present invention is made by taking the point mentioned above into consideration, and an object of the present invention is to provide a sealing device provided with a function that a plurality of tubular members such as the plug tubes or the like can be inserted therein side by side so as to be sealed.

Means for Solving the Problem

In order to achieve the object mentioned above, in accordance with a first aspect of the present invention, there is provided a sealing device attached in an opening portion of a housing for sealing between the housing and tubular members inserted to the opening portion of the housing, wherein the sealing device integrally has a mounting portion fixed to the housing, seal lips brought into close contact with an outer peripheral surfaces of the tubular members and following deformation portions provided between the mounting portion and the seal lips, the mounting portion has a plurality of tubular inner surfaces, in which the tubular members are inserted, within a flat surface, and a plurality of the seal lips and the following deformation portions are provided in correspondence to the respective tubular inner surfaces.

Further, in accordance with a second aspect of the present invention, there is provided a sealing device as recited in the first aspect mentioned above, wherein the mounting portion is formed in a flat oval shape in such a manner as to have a plurality of tubular inner surfaces within the flat surface, and a metal ring having the same flat oval shape is buried in a peripheral edge portion of the mounting portion.

Further, in accordance with a third aspect of the present invention, there is provided a sealing device as recited in the first or second aspect mentioned above, wherein the housing corresponds to a cylinder head cover in the internal combustion engine, and the tubular members correspond to plug tubes or injection pipes inserted to the opening portion of the cylinder head cover.

In the sealing device in accordance with the first aspect of the present invention provided with the structure mentioned above one mounting portion fixed to the housing is provided, and a plurality of tubular inner surfaces, in which the tubular members are inserted, are provided side by side within the flat surface of the mounting portion. A direction of the flat surface of the mounting portion and center axes of the tubular inner surfaces are generally orthogonal. Further, a plurality of seal lips and following deformation portions are provided side by side in correspondence to the respective tubular inner surfaces. The following deformation portion is deformed following the tubular member at a time when the tubular member is displaced in a diametrical direction with respect to the tubular inner surface, thereby making the seal lip follow the tubular member. Accordingly, it is possible to insert a plurality of tubular members as an entire of the sealing device, by inserting the tubular members to each of the tubular inner surfaces one by one.

In the case that two tubular inner surfaces are arranged side by side, it is rational to form a flat surface shape of the mounting portion having the tubular inner surfaces in the flat surface in an oval shape, the housing is provided with the opening portion open in the same oval shape, and the mounting portion is fixed to the opening portion. While the metal ring is generally used for fixing, a flat surface shape of the metal ring is formed in an oval shape.

EFFECT OF THE INVENTION

The present invention achieves the following effects.

In the sealing device in accordance with the first aspect of the present invention provided with the structure mentioned above, since one mounting portion fixed to the housing is provided, a plurality of tubular inner surfaces, in which the tubular members are inserted, are provided side by side within the flat surface of the mounting portion, and a plurality of seal lips and following deformation portions are provided side by side in correspondence to the respective tubular inner surfaces, it is possible to insert a plurality of tubular members as an entire of the sealing device so as to be sealed, by inserting the tubular members to each of the tubular inner surfaces one by one. Accordingly, it is possible to provide the sealing device preferably utilized for the inserting structures arranged side by side such as the twin plug mentioned above.

Further, in the sealing device in accordance with the second aspect of the present invention, since the mounting portion and the metal ring are formed in the flat oval shape, the rational shape for arranging two tubular inner surfaces side by side is provided. In this case, the term "rational" means that it is easy to manufacture each of the parts and the flat area of each of the parts can be made small, and specifically means that it is possible to make the flat area of the seal small, and a dimensional control can be more easily executed in comparison with the case that a straight portion of the present invention is connected with a large R shape. Accordingly, it is possible to finish the sealing device in accordance with the first aspect as a product for a practical use.

Further, the present invention is preferably utilized as a plug tube gasket, an injection pipe seal or the like. In this case, the housing in the first aspect or the second aspect corresponds to a cylinder head cover in an internal combustion engine, and the tubular member corresponds to a plug tube of a gasoline system or an injection pipe of a diesel system (a third aspect).

In addition, since the sealing device in accordance with the present invention has the following deformation portion as one of the constituting elements, the sealing device allows the tubular member such as the plug tube, the injection pipe or the like to be inserted in a state of being displaced in a diametrical direction to a certain degree (achieving a predetermined sealing function in this case). Accordingly, the sealing device is called as an eccentric seal on the basis of this function.

BRIEF DESCRIPTION OF THE DRAWINGS

FIGS. 8A and 8B are views of a single body of a metal ring provided in the sealing device, in which FIG. 8A is a sectional view and FIG. 8B is a bottom view;

FIG. 11A is a sectional view of a sealing device in accordance with a third embodiment of the present invention, and FIG. 11B is a sectional view of a sealing device in accordance with a fourth embodiment of the present invention.

DESCRIPTION OF REFERENCE NUMERALS

| 1 | sealing device |
| --- | --- |
| 2 | cylinder head cover (housing) |
| 2a | opening portion |
| 2b | step portion |
| 3 | plug tube (tubular member) |
| 3a | outer peripheral surface |
| 4 | mounting portion |
| 5 | tubular inner surface |
| 6 | seal lip |
| 6a | lip end |
| 7 | following deformation portion |
| 8 | metal ring |
| 8a | tubular portion |
| 8b, 8c | flange portion |
| 9 | garter spring |
| 10 | seal bead |
| 11, 13 | gap portion |
| 12 | outer peripheral seal portion |
| C | diametrical gap |

DETAILED DESCRIPTION OF PREFERRED EMBODIMENT

The present invention includes the following embodiments.

A sealing device (an eccentric seal) in which a seal with a housing is integrally formed at such a magnitude that two membranes are accommodated, while having two membranes (seal lips) for sealing with a plug tube or an injection pipe. Accordingly, a seal space can be made small.

EMBODIMENT

Next, a description will be given of embodiments in accordance with the present invention with reference to the accompanying drawings.

First Embodiment

Figure 1:
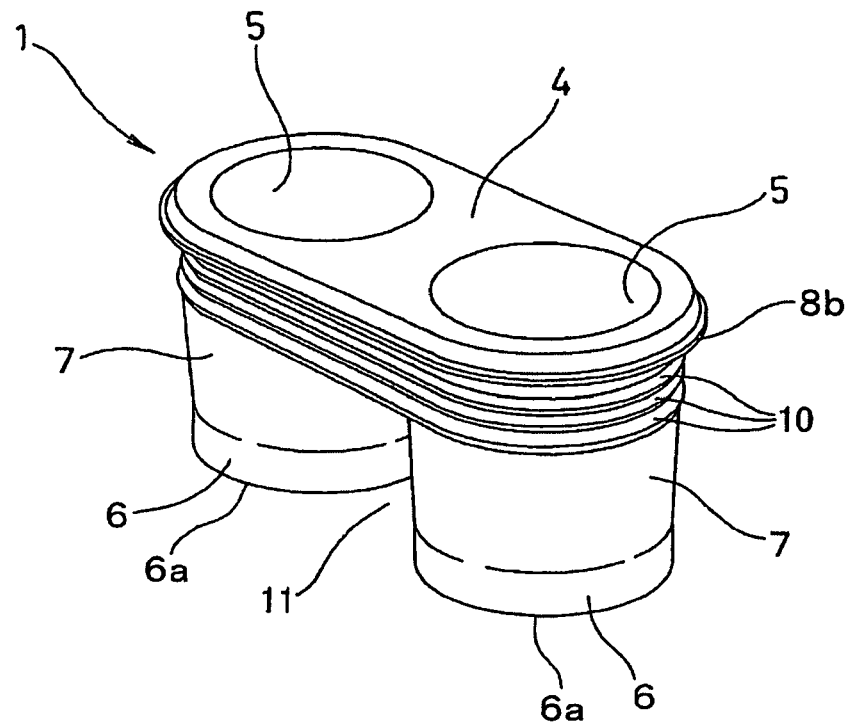
FIG. 1 is a perspective view of a sealing device in accordance with a first embodiment of the present invention.
Figure 2:
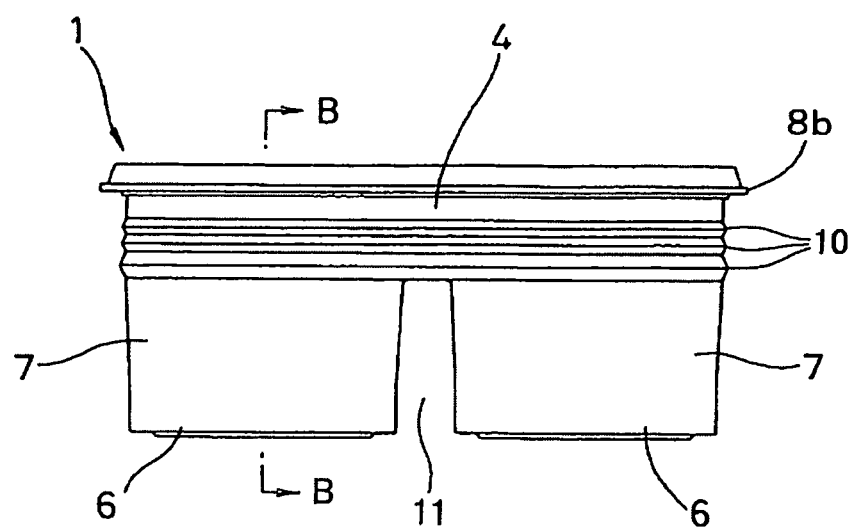
FIG. 2 is a front view of the sealing device.
Figure 3:
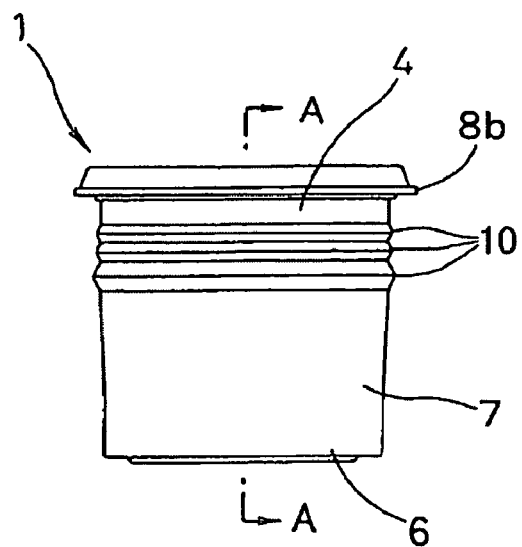
FIG. 3 is a side view of the sealing device.
Figure 4:
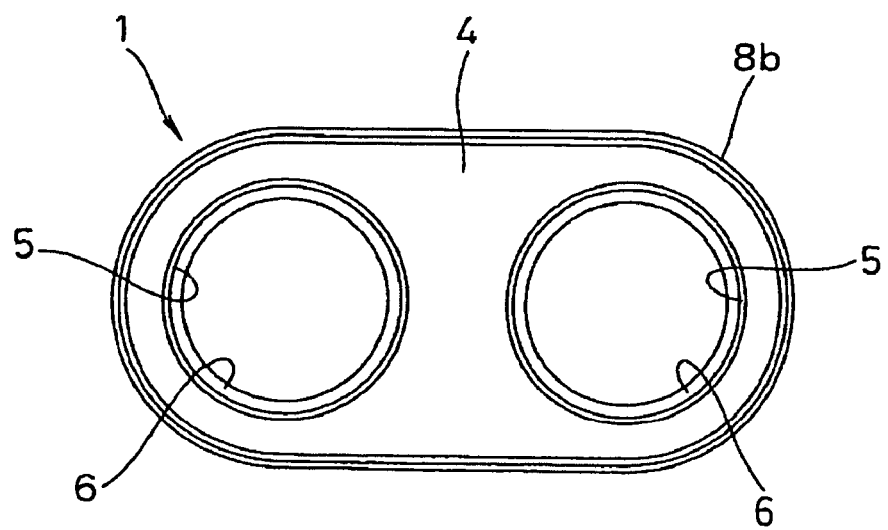
FIG. 4 is a plan view of the sealing device.
Figure 5:
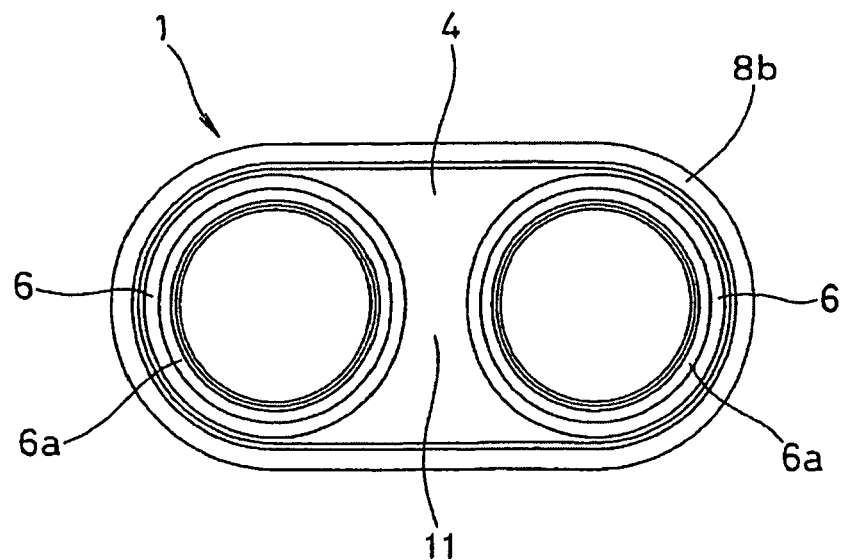
FIG. 5 is a bottom view of the sealing device.
Figure 6:
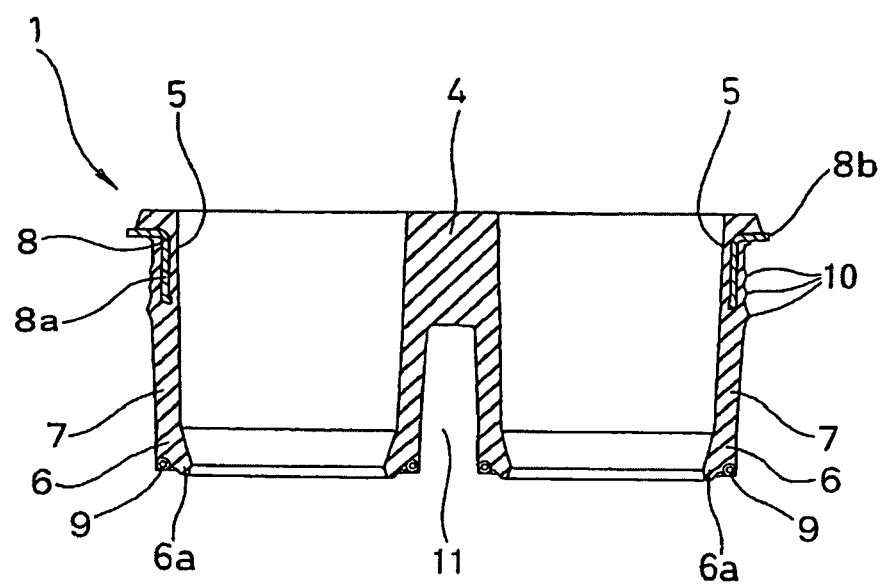
FIG. 6 is a sectional view along a line A-A in FIG. 3.
Figure 7:
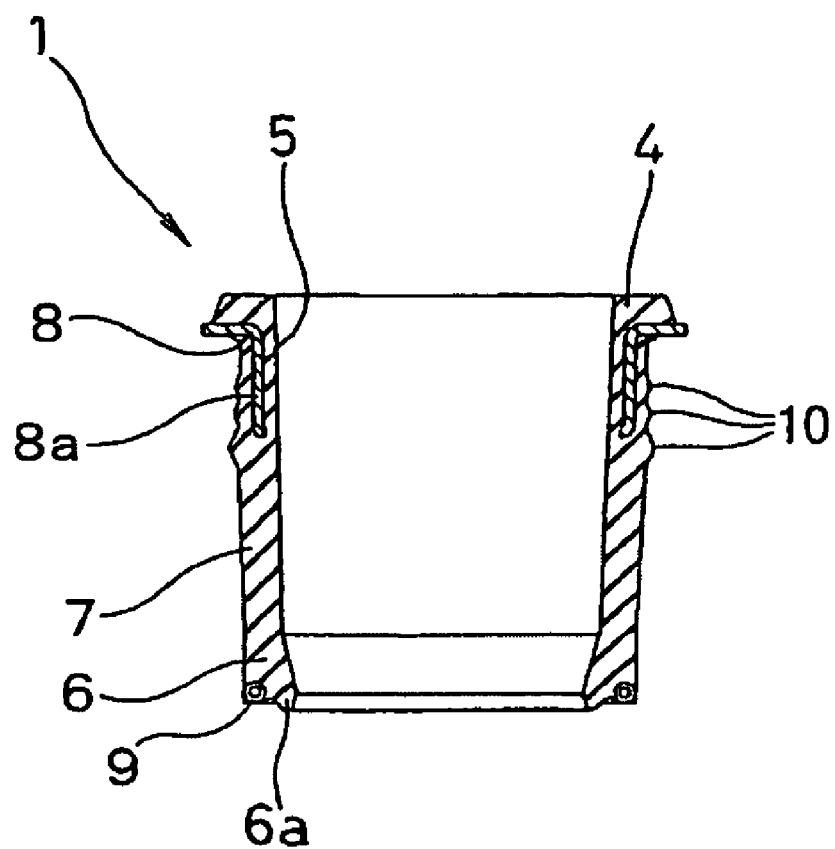
FIG. 7 is a sectional view along a line B-B in FIG. 2.
Figure 8A:
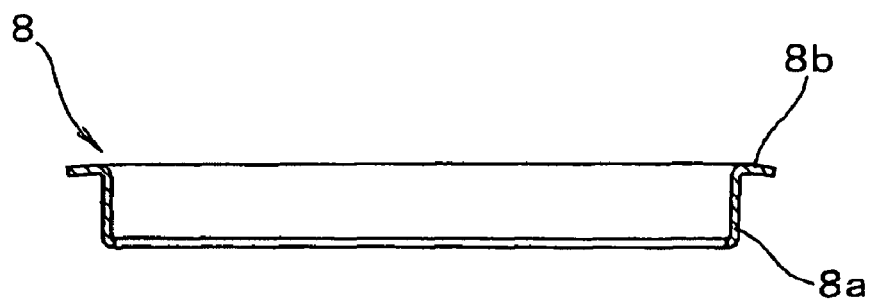
Figure 8B:
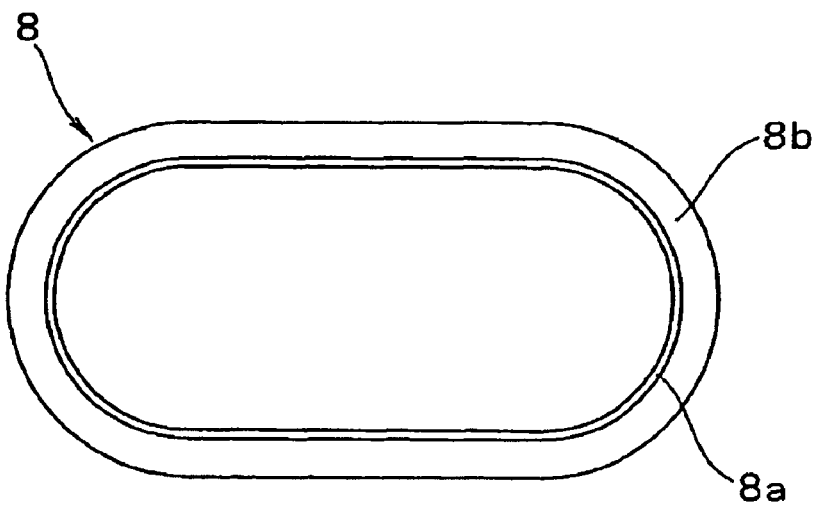
Figure 9:
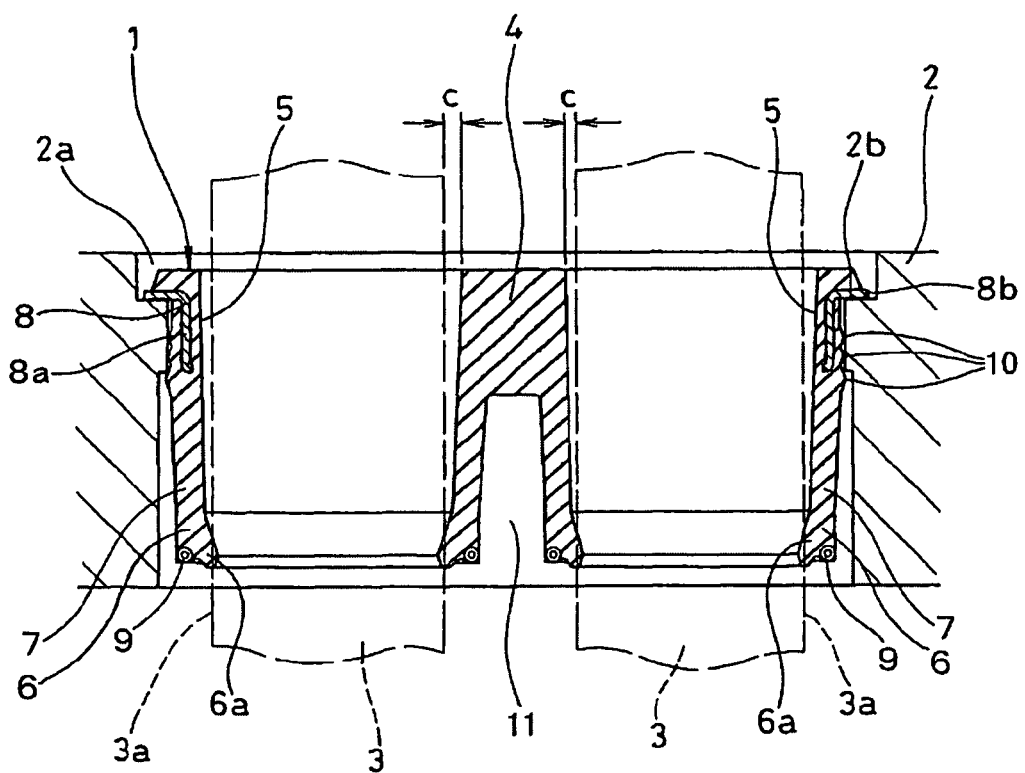
FIG. 9 is a sectional view showing an installed state of the sealing device.

FIGS. 1 to 9 show a sealing device 1 in accordance with a first embodiment of the present invention. In particular, FIG. 1 is a perspective view of the sealing device, FIG. 2 is a front view, FIG. 3 is a side view, FIG. 4 is a plan view, FIG. 5 is a bottom view, FIG. 6 is a sectional view along a line A-A in FIG. 3, FIG. 7 is a sectional view along a line B-B in FIG. 2, FIG. 8 is a view of a single body of a metal ring 8 provided in the sealing device 1, and FIG. 9 shows an installed state of the sealing device 1.

A sealing device (a plug tube gasket) 1 in accordance with the embodiment is attached in a peripheral edge of an opening portion 2a of a cylinder head cover 2 so as to seal between the cylinder head cover 2 (FIG. 9) in an internal combustion engine and plug tubes 3 (FIG. 9), is brought into close contact with outer peripheral surfaces 3a of the plug tubes 3 inserted to the opening portion 2a, and is structured as follows.

The sealing device 1 has a flat plate shaped mounting portion (an outer peripheral mounting portion) 4 fixed to a peripheral edge of the opening portion 2a in the head cover 2, and two tubular inner surfaces (tubular spaces) 5, in which the plug tubes 3 are inserted, are provided side by side within a flat surface of the mounting portion 4. Further, two annular seal lips (inner peripheral lips) 6 are provided side by side in a lower surface side of the mounting portion 4 in correspondence to the respective tubular inner surfaces 5, and cylindrical following deformation portions 7 are integrally formed between the mounting portion 4 and the respective seal lips 6. The following deformation portions 7 are elastically deformed while following the plug tube 3 at a time when the plug tube 3 is displaced in a diametrical direction with respect to the tubular inner surface 5, thereby making the seal lip 6 follow the plug tube 3. Further, the following deformation portion 7 is provided for making the seal lip 6 follow an eccentricity of the plug tube 3, and is formed in such a manner as to extend from the mounting portion 4. The following deformation portion 7 may be called as a membrane portion on the basis of a shape thereof. Further, the tubular inner surfaces 5, and the inner peripheral surfaces of the following deformation portions 7 and the seal lips 6 form a flush inner surfaces respectively (the inner surfaces may be formed as cylindrical surfaces or may be formed as tapered conical surfaces narrowed to the seal lip 6 side).

Further, the sealing device 1 is constituted by a predetermined rubber-like elastic body as a whole, and a metal ring 8 is buried in the mounting portion 4 and garter springs 9 are buried in the seal lips 6 respectively with respect to the rubber-like elastic body.

The mounting portion 4 is formed in a flat oval shape in such a manner that the two tubular inner surfaces 5 arranged side by side can be accommodated in the flat surface, and the metal ring 8 formed in the same flat oval shape is buried in an outer peripheral edge portion of the flat oval mounting portion 4, as shown in FIG. 8.

The metal ring 8 is structured such that an outward flange portion 8b is integrally formed in an upper end of a tubular portion 8a, which is completely buried within the rubber-like elastic body forming the mounting portion 4, around an entire periphery, and at least a lower surface of the flange portion 8b is exposed from the rubber-like elastic body. Further, a desired number of (three in the drawing) seal beads 10 are integrally formed in an outer peripheral surface of the rubber-like elastic body forming the mounting portion 4 around an entire periphery so as to be positioned in an outer peripheral side of the tubular portion 8a.

Each of the seal lips 6 is formed in a slightly tapered cylindrical shape, and the garter spring 9 for regulating a surface pressure is buried in a leading end lip end 6a brought into close contact with the outer peripheral surface 3a of the plug tube 3. A gap portion 11 is provided between the right and left seal lips 6.

An outer peripheral edge circular arc portion of the mounting portion 4, the tubular inner surface 5, the seal lip 6, a circular arc portion of the metal ring flange portion 8b and a circular arc portion of the seal bead 10 are coaxially arranged.

The sealing device 1 having the structure mentioned above is detachably attached to the opening portion 2a of the head cover 2 from an outer side (an upper side) of the head cover 2, as shown in FIG. 9. The opening portion 2a of the head cover 2 is formed in a flat oval shape similarly in such a manner as to fit the flat oval mounting portion 4. The flange portion 8b of the metal ring 8 is struck against a step portion 2b provided in the inner surface of the opening portion 2a, whereby the fitted sealing device 1 is positioned in a fitting direction. Accordingly, when the plug tubes 3 are inserted as shown by a dotted line on the drawing, the mounting portion 4 constituted by the rubber-like elastic body is brought into close contact with the inner peripheral surface of the opening portion 2a of the head cover 2 at the seal beads 10, and the seal lips 6 are brought into close contact with the outer peripheral surfaces 3a of the plug tubes 3 at the lip ends 6a. Accordingly, it is possible to sufficiently seal between the head cover 2 and the plug tubes 3.

Further, since diametrical gaps c having a predetermined dimension are set between the cylindrical inner surfaces 5 and the outer peripheral surfaces 3a of the plug tubes 3, the following deformation portions 7 are elastically deformed even if the plug tubes 3 are inserted in a state of being displaced in a diametrical direction to a certain degree (for example, 1.2 mm). Therefore, it is possible to seal between the cylindrical inner surfaces 5 and the plug tubes 3.

Further, since the sealing device 1 having the structure mentioned above is provided with one mounting portion 4 fixed to the head cover 2, two tubular inner surfaces 5, in which the plug tubes 3 are inserted, are provided side by side within the flat surface of the mounting portion 4, and two seal lips 6 and two following deformation portions 7 are provided side by side in correspondence to the respective tubular inner surfaces 5, it is possible to insert a plurality of plug tubes 3 as a whole of the sealing device 1 so as to seal, by inserting the plug tubes 3 to the respective tubular inner surfaces 5 one by one. Accordingly, it is possible to provide the sealing device 1 which can be preferably utilized for inserting structures arranged side by side such as the twin plug.

Further, in the sealing device 1 having the structure mentioned above, since the mounting portion 4 and the metal ring 8 are formed in the flat oval shape, the rational shape for arranging two tubular inner surfaces 5 side by side is provided. Accordingly, it is possible to provide the practical sealing device 1 in which each of the parts can be easily manufactured and the flat area of each of the parts can be reduced.

In this case, the sealing device 1 in accordance with the first embodiment can be modified as follows.

Second Embodiment

Figure 10:
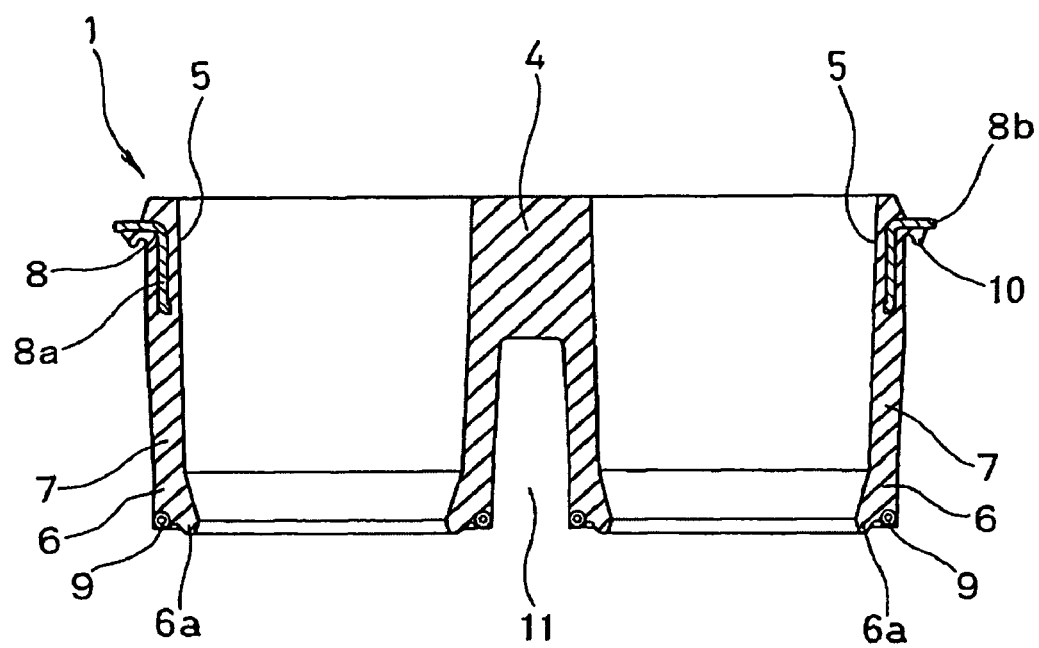
FIG. 10 is a sectional view of a sealing device in accordance with a second embodiment of the present invention.
Figure 12:
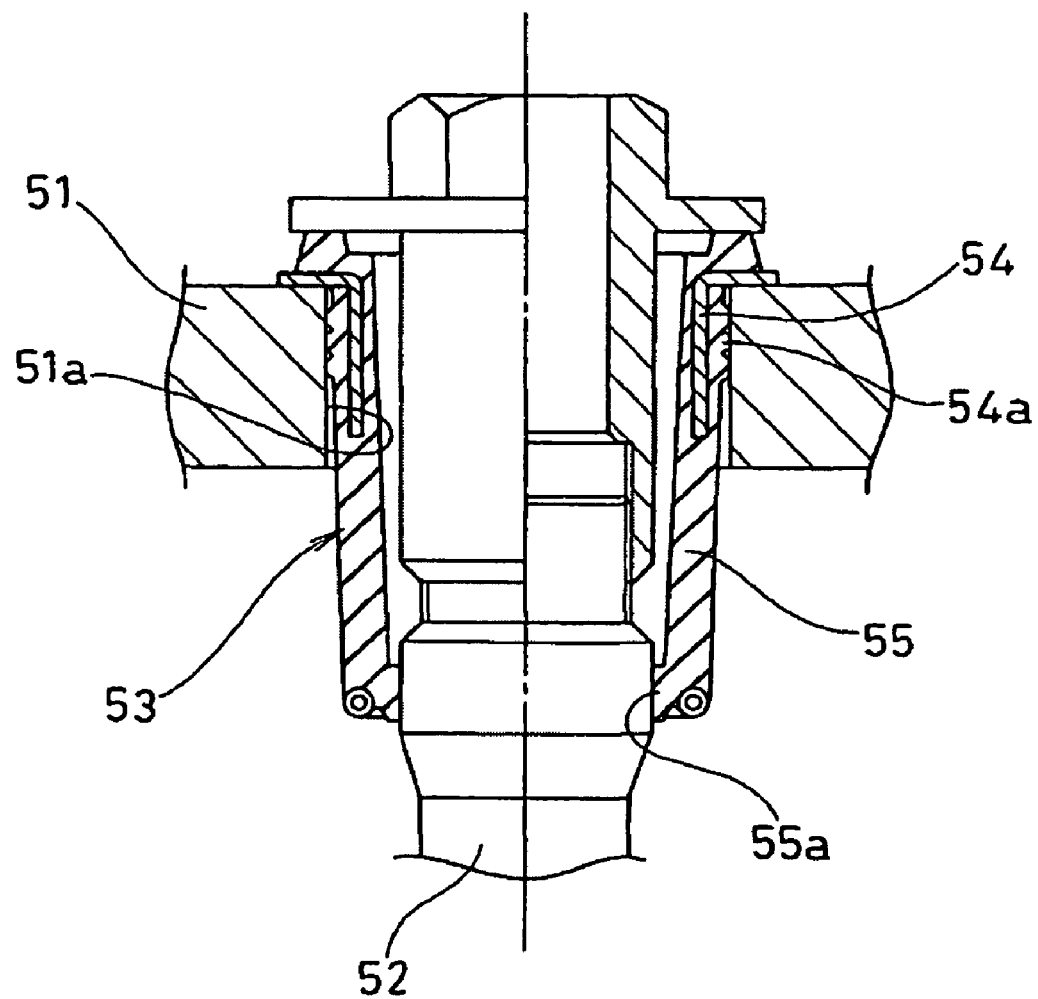
FIG. 12 is a cross sectional view of a sealing device in accordance with a prior art.

In the first embodiment mentioned above, the structure is made such that the sealing performance with respect to the head cover 2 is improved by forming the seal beads 10 in the outer peripheral surface of the mounting portion 4. However, the structure may be made, as shown in FIG. 10, such that a rubber-like elastic body is baked on the lower surface of the flange portion 8b of the metal ring 8, and the seal bead 10 is integrally formed in the elastic body. In this case, the seal bead 10 is provided downward, and is closely attached to the step portion 2b in the inner surface of the opening portion 2a at a time of being installed.

Third and Fourth Embodiments

In the first embodiment mentioned above, the following deformation portions 7 and the seal lips 6 are integrally formed in a downward cylindrical shape at the lower surface side of the mounting portion 4. However, the structure may be made, as shown in FIG. 11A or 11B, such that the seal lips 6 are formed in an oil seal shape.

In an embodiment in FIG. 11A, the seal lips 6 having the oil seal shape are integrally formed as an upward structure at the inner peripheral side of the mounting portion 4 via bellows-shaped following deformation portions 7. An outer peripheral seal portion 12 closely attached to the inner surface of the opening portion 2a of the head cover 2 is integrally formed in the outer peripheral surface of the rubber-like elastic body forming the mounting portion 4 all around the periphery, and gap portions 13 connected to the gap portion 11 between the right and left seal lips 6 are provided between the mounting portion 4 and the following deformation portions 7. Further, the metal ring 8 is provided with an inward flange portion 8c in place of the outward flange portion 8b.

Further, in an embodiment in FIG. 11B, the seal lips 6 having the oil seal shape is integrally formed as a conical downward structure at the inner peripheral side of the mounting portion 4 via the following deformation portions 7. The outer peripheral seal portion 12 closely attached to the inner surface of the opening portion 2a of the head cover 2 is integrally formed in the outer peripheral surface of the rubber-like elastic body forming the mounting portion 4 all around the periphery, and the gap portions 13 connected to the gap portion 11 between the right and left seal lips 6 are provided between the mounting portion 4 and the following deformation portions 7. Further, the metal ring 8 is provided with the inward flange portion 8c in place of the outward flange portion 8b.

What is claimed is:

1. A sealing device attached in an opening portion of a housing including a cylinder head cover in an internal combustion engine and sealing clearances between said housing and tubular members, including one of plug tubes and injection pipes, inserted into the opening portion of said housing, the sealing device comprising a flat mounting portion fixed to said housing, seal lips brought into close contact with outer peripheral surfaces of said tubular members and flexible deformation portions provided between said mounting portion and the seal lips, said mounting portion, said seal lips and said flexible deformation portions being made of an elastic material, said mounting portion has a plurality of tubular inner surfaces, in which said tubular members are inserted, each of said tubular inner surfaces being provided with each of said seal lips and each of said flexible deformation portions; and said mounting portion being formed into an oval shape in a plan view so that said tubular inner surfaces are juxtaposed in a same flat plane, and a metal ring embedded in a peripheral edge portion of said mounting portion.

* * * * *